United States Patent [19]

Lackner

[11] Patent Number: 4,844,017

[45] Date of Patent: Jul. 4, 1989

[54] FEED-DISPENSING APPARATUS

[76] Inventor: Karl H. Lackner, Bauberg 21, 6921 Ittlingen (Baden-Württemberg, Fed. Rep. of Germany

[21] Appl. No.: 923,333

[22] Filed: Oct. 27, 1986

[30] Foreign Application Priority Data

Oct. 26, 1985 [DE] Fed. Rep. of Germany ....... 3538179

[51] Int. Cl.$^4$ .......................................... A01K 39/012
[52] U.S. Cl. .................................................. 119/52 B
[58] Field of Search ............. 119/52 A, 52 B, 52 AF, 119/52 R; 198/533, 642; 193/2 D, 2 R, 32, 25 R; 239/142

[56] References Cited

U.S. PATENT DOCUMENTS

| | | | |
|---|---|---|---|
| 4,056,215 | 11/1977 | Zwahlen | 198/533 |
| 4,195,594 | 4/1980 | Siciliano et al. | 119/52 B |
| 4,337,729 | 7/1982 | Peppler et al. | 119/52 B |
| 4,346,802 | 8/1982 | Popper | 198/533 |
| 4,379,439 | 4/1983 | Baur | 119/52 B |

FOREIGN PATENT DOCUMENTS 3213688 10/1983 Fed. Rep. of Germany ........ 119/52

Primary Examiner—Robert Peshock
Assistant Examiner—Michael Lynch
Attorney, Agent, or Firm—Theodore J. Koss, Jr.

[57] ABSTRACT

The apparatus travels along a multi-tier arrangement of poultry cages, each tier comprising two rows of cages, the cages in these two rows adjoining back-to-back. The apparatus has transversely spaced, depending side units travelling along the cage-fronts and each including a feed container and a lift conveyor lifting feed from the container up to levels associated with the different tiers. At each such level a respective outflow chute on each side unit receives feed, continuously, from the lift conveyor and discharges the same into a feed trough that extends horizontally along the cage-fronts at the respective long side of the multi-tier cage arrangement, so that during dispensing-apparatus travel each longitudinally successive portion of the feed trough receives feed directly from the travelling outflow chute's discharge end. Each chute has an internal feed-flow passage formed by an inclined bottom wall, down along which the feed slides, as well as side walls and a top wall. A large part of the bottom wall is absent, forming a wall opening through which the face of a rotating disk is exposed, this face forming part or most of the passage's bottom boundary surface. During dispensing-apparatus travel, each disk rotates to prevent feed in the chute from cohering therein in a manner that could result in undesirable brief clogging of such feed with resultant undesirable non-uniformities, or even gaps, in the longitudinally extending carpet of feed that the travelling outflow chute is laying down along the length of the feed trough.

18 Claims, 3 Drawing Sheets

FEED-DISPENSING APPARATUS

BACKGROUND OF THE INVENTION

The invention concerns travelling feed dispensers used to dispense feed, typically feed for poultry, into the feed trough of each cage of a long row of cages in multi-tiered arrangements in which several such long rows of cages are arranged one atop the other to form a multi-tier long row of cages.

Usually, such travelling feed dispensers include a feed container, some type of lift conveyor for lifting feed up from the bottom region of the container up to the different heights of the different tiers or cage-rows, with the lift conveyor having outlet openings, each associated with the level of one of the tiers; and additionally, outflow chutes arranged at different heights in correspondence to the different heights of the different tiers, each outflow chute having an upper end which receives feed from a respective outlet opening of the lift conveyor, the outflow chute extending at a downwards incline from its upper or feed-receiving end towards its bottom or feed-discharging end, at which it is provided with a discharge opening from which feed is discharged into a respective one of several feed troughs—the several feed troughs being arranged at different height levels, in correspondence to the different height levels of the different tiers or cage-rows, with each such feed trough extending along the length of the respective row of cages contained in the respective tier.

A travelling feed dispenser of the general type outlined above is disclosed in Federal Republic of Germany Gebrauchsmuster 74 13 448. The travelling feed dispenser is designed for use with a doubled arrangement of tierwise-arranged cage-rows, namely one in which each tier consists of a long row of pairs of cages, each pair of cages consisting of first and second cages which adjoin each other back-to-back, indeed sharing a common back in certain cases, the cages here likewise usually being provided for poultry. Each long tier of cage-pairs is provided with first and second feed troughs, both extending horizontally along the length of the respective tier; the first feed trough extends horizontally along the front sides of the first cages of the cage-pair row that forms the respective tier, whereas the second feed trough extends horizontally along the front sides of the second cages of the cage-pair row that forms that tier. The travelling feed dispenser embraces this doubled arrangement of tierwise-arranged cage-pair rows from above. In particular, the feed dispenser has first and second side units which are joined together above the level of the highest one of the several tiers. The first side unit of the travelling feed dispenser is located to travel along the front sides of the first cages of the tierwise-arranged cage-pair rows, whereas the second side unit of the travelling feed dispenser is located to travel along the front sides of the second cages of the tierwise-arranged cage-pair rows. The first and second side units of such doubled travelling feed dispenser each include a respective feed container provided with a respective lift conveyor, the lift conveyor having at different heights outlet openings to which are connected the various outflow chutes for the various tiers, namely substantially as described earlier, and the feed dispenser can travel as a whole along the length of the multi-tier arrangement of cage-pair rows, riding on a track formed by two guide rails. Thus, when the doubled feed dispenser makes one trip, namely from one to the other end of the multi-tier arrangement of cage-pair rows, feed is supplied into both the first and second feed trough of each tier, along the entire length of each such trough.

The above-described travelling feed dispenser thus performs a direct discharge of feed into each longitudinally successive portion of each feed trough. Such is a marked improvement over the method of filling the feed troughs by, simply, transporting or advancing feed longitudinally inside the long feed trough. Namely, with such simpler methods, if the feed is a mix of distinct ingredients, for example a mix of different types of seeds or a mix of seeds and bulk or filler material, the ingredient preferred by the occupants of the cages will be preferentially picked at and removed, so that the percentage content of that particular ingredient will be found to be lower and lower in the feed arriving at cages that are located more and more downstream. Also, with such simpler method, the use of a feed-transport chain, or the like, to advance feed longitudinally inside the long feed trough can be disadvantageous for another reason also. Namely, although feed of the proper recipe is supplied at the upstream end of such feed-transport chain, or the like, feed residues can, after a certain period of time, build up and remain in the trough and, being likewise typically made up of the feed ingredients least preferred by the cage occupants, the result can be a general degradation in the quality of the feed available at all locations along the feed trough.

Although the travelling feed dispenser of the above German Gebrauchsmuster 74 13 448 does, as just explained, avoid such disadvantages, it exhibits certain disadvantages of its own. Chiefly, as the dispenser travels along the length of the feed trough, directly delivering feed to each successive location along the trough, it can nevertheless happen that the amount of feed delivered to each location on the trough is different at different locations, i.e., at different cages along the trough; in the worst case, it can even happen that gaps of lesser or greater length appear in the lengthwise-extending carpet of feed being formed along the length of the trough. Such variations or even the formation of gaps can result, in particular, when the feed, as it slides down the inclined outflow chute that discharges into the feed trough, exhibits even briefly any tendency to cohere and not fall freely out of the bottom, open end of the outflow chute, thus becoming in a sense jammed or clogged until subsequently arriving feed, entering the top end of the inclined outflow chute from one of the outflow openings of the lift conveyor, causes the cohering mass of feed to finally drop out, somewhat bunched-together, from the discharge end of the outflow chute. In the travelling dispenser of the above German Gebrauchsmuster this danger is counteracted by suspending, inside each outflow chute, a coarse mesh or framework made of wire extending down to near the open bottom end of the inclined outflow chute. This wire framework is made to reciprocate, generally vertically, inside the outflow chute by means of a reciprocating-motion mechanism that comprises an eccentric, a two-armed lever mounted such that it in part extends into the outflow chute and in part extends out therefrom, and a linkage rod which engages the two-armed lever. This vibratory or shaking-action mechanism does in fact counteract any tendency of the feed present in the outflow chute to cohere and not flow out freely, so that a very continuous and uniform discharge of feed is indeed assured. This is achieved, however, by means of added manufacturing cost and operating complexity. In particular, it can be very difficult to gain access to those components of the vibratory or shaking-action mechanism that are located actually internal to the outflow chute or in awkwardly accessible locations near the latter. Furthermore, the incessant shaking or vibratory action produces various mechanical stresses upon the apparatus, leading to increased rates of wear on certain components thereof, decreased rigidity of assembled structural components, and the like. Finally, although the vibratory or shaking-action mechanism does achieve a very uniform and continuous feed outflow, the mere presence of such a mechanism interiorly of the outflow chute constitutes, in itself, and in a more general sense, an obstacle to the flow of feed through the outflow chute, which may need to be counteracted by some means, whether dimensional or operational.

SUMMARY OF THE INVENTION

It is one general object of the invention to provide a travelling feed-dispensing apparatus along the general lines described earlier, but of such a construction and manner of operation that, although continuous discharge of feed at a very uniform rate from the outflow chute continues to be achieved, this is accomplished without so great an increase in cost and complexity, without similar problems of difficult access, and in a fashion which exhibits a much decreased tendency to be wear- and/or maintenance-intensive.

In accordance with a general concept of the present invention, the feed-flow passage internal to the outflow chute is defined not in its entirety by boundary surfaces simply constituted by the internal wall surfaces of the outflow chute itself, such wall surfaces exhibiting no motion relative to one another nor relative to the travelling feed dispenser, but instead is in part defined by a further boundary-surface portion which exhibits motion relative to the remainder of the boundary surfaces that define the outflow chute's interior feed-flow passage, the exhibited motion being of such a character as to facilitate the flow of feed through the outflow chute and counteract any tendency of the feed in the outflow chute to cohere and be discharged from the chute at a non-uniform rate.

In accordance with the presently preferred embodiment of the invention, disclosed herein, the aforementioned further boundary surface portion is provided by one of the two faces of a rotating circular disk, the internal wall surfaces of the outflow chute including a wall surface portion which is inclined and the disk exhibiting the same degree of incline and forming a continuation of such inclined internal wall surface portion of the outflow chute. In particular, the feed slides down the inclined outflow chute, supported from below by the inclined face of the rotating disk during at least a part of the downwardly inclined flow of the feed through the chute, and is subjected to the effects of the rotary motion of the face of the rotating disk. The rotating disk is rotated by a rotation-imparting drive arrangement.

In accordance with such concepts there need not be, as would be the case with the earlier-described shaking member internally of the outflow chute, any structure inside the outflow chute that would constitute, in general, an obstacle to feed flow, nor is there a need for a vibratory or shaking action such as places stresses upon various parts of the travelling feed dispenser, leading to wear and possible loss of overall rigidity and smoothness of operation.

In the preferred embodiment illustrated in the drawing each outflow chute is not a unitary element, i.e., is not of uninterrupted construction considered in the direction circumferential to the general direction of elongation of the outflow chute, but instead is provided with a wall opening, this wall opening being closed off by the inclined disk. Indeed, this wall opening is always maintained closed off by the disk, if the disk is maintained in rotation in a rotation plane which coincides with the boundary-surface-forming face thereof. However, as already indicated in more general terms above, relative motion occurs between the part of the outflow chute's internal boundary surface that is actually constituted by the disk face, on the one hand, and, on the other hand, the remainder of the internal boundary surface of the outflow chute, as well as relative to the feed that is at any given time located inside the chute. Even comparatively slow rotation of the disk can serve very effectively to prevent clogging of feed inside the outflow chute. Not only are the deleterious effects of vibratory or shaking-motion mechanism eliminated, but such mechanisms, presenting as already described various problems of access, can themselves be eliminated. In particular, the disk can be driven by means of a drive or transmission that is located at the outwards-facing face thereof, namely at the one of the disk's two main faces that does not face inwardly to form part of the interior boundary surface of the outflow chute. In this way, the drive system, of whatever character, for the disk need not even in part be located interiorly of the outflow chute where it would form in itself a flow obstacle and might in itself contribute to feed clogging; thus, flow of feed through the interior of the outflow chute can be entirely free and unobstructed. Furthermore, the drive mechanism for the disk can be located as far from the disk and outflow chute as needed or desired or, more generally said, be located where access to such drive mechanism will be fast, easy and safe.

In the herein-illustrated embodiment of the invention, presently thought to be the most preferred and best, each disk extends over substantially the entire length of the associated outflow chute, namely such that the feed-supporting, inclined, bottom internal boundary surface portion of the chute's internal flow passage be constituted, to the maximum extent feasible, by the inwards-facing face of the disk itself, so that the effects contributed by the disk's motion be felt, to the extent possible, all the way from the inlet end to the outlet end of the outflow chute. In this respect, such disk can be of dimensions and location such that it extends, as considered in the feed-dispenser travel direction, beyond both sides of the outflow chute. Such an expedient facilitates the implementation of the feature set forth above; namely, in this way a maximum fraction of the feed-supporting, inclined, bottom internal boundary surface portion of the chute's internal flow passage can be replaced by the inwardly-facing face of the disk itself, to provide the benefits of the disk's motion from one end of the outflow chute to its other end, while yet being able to maintain the breadth of the chute, measured in the feed-dispenser's travel direction, at substantially a single value.

In the preferred embodiment the disk is located laterally of the associated overflow chute, namely offset therefrom considered in the travel direction of the feed dispenser, such that the non-rotating or center point of the rotating disk's face be located laterally offset from, and indeed laterally beyond the wall opening in the inclined bottom wall of the chute, i.e., the wall opening at which the inwards face of the disk presents itself to the interior of the chute. In this way, at any given moment in time, all points on the portion of the disk face presented to the chute's interior via such wall opening are moving in generally the same direction relative to the general direction in which the outflow chute extends; or more precisely said, each such point moves with a velocity having two vector components of which a first vector component is oriented in the same direction as the general direction in which the outflow chute extends, with the polarity if not the magnitude of this first vector component for all such points being the same. Furthermore the speed of motion of the relevant points on the disk face depends upon their distance from the disk axis. Because of the lateral offset of the rotation axis, each such disk can be operated at a comparatively low rotational speed. The greater the disk diameter, and the greater the lateral offset of the disk axis from the outflow chute, the lower the rotational speed (measured in rpm) can be, and the more nearly identical, in a vectorial sense, become the velocities of all relevant disk points. The optimum numerical values for the disk diameter, the lateral offset of the disk axis, and the disk's rotary speed depend—it will be understood—upon the type of feed in question, e.g. whether dry or somewhat moist, the volumetric or weight rate of delivery of feed by the lift conveyor, the flow-cross-section of the outflow chute, and so forth, as well as factors such as desired cost limits (e.g. for the drive power for large disks), and also considerations of design convenience, such as size or space limits.

In accordance with an advantageous concept of the invention, exhibited in the preferred embodiment illustrated herein, the drive torque for the disks is derived from the drive system utilized to implement travel of the feed dispenser as a whole. One advantage of such technique is that the feed-flow-improving action of the disks, present only when the disks are in rotation, occurs only when the feed dispenser is in the course of travelling from one to the other end of the tierwise-arranged rows of cages. Likewise of advantage is the fact that, in such event, a separate drive motor for each disk, or for all the disks but independent of the travel-implementing drive system, is made unnecessary, and means for activation and deactivation of such independent drive system(s) for the disks, namely at the times proper for activation and deactivation, need not be provided.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
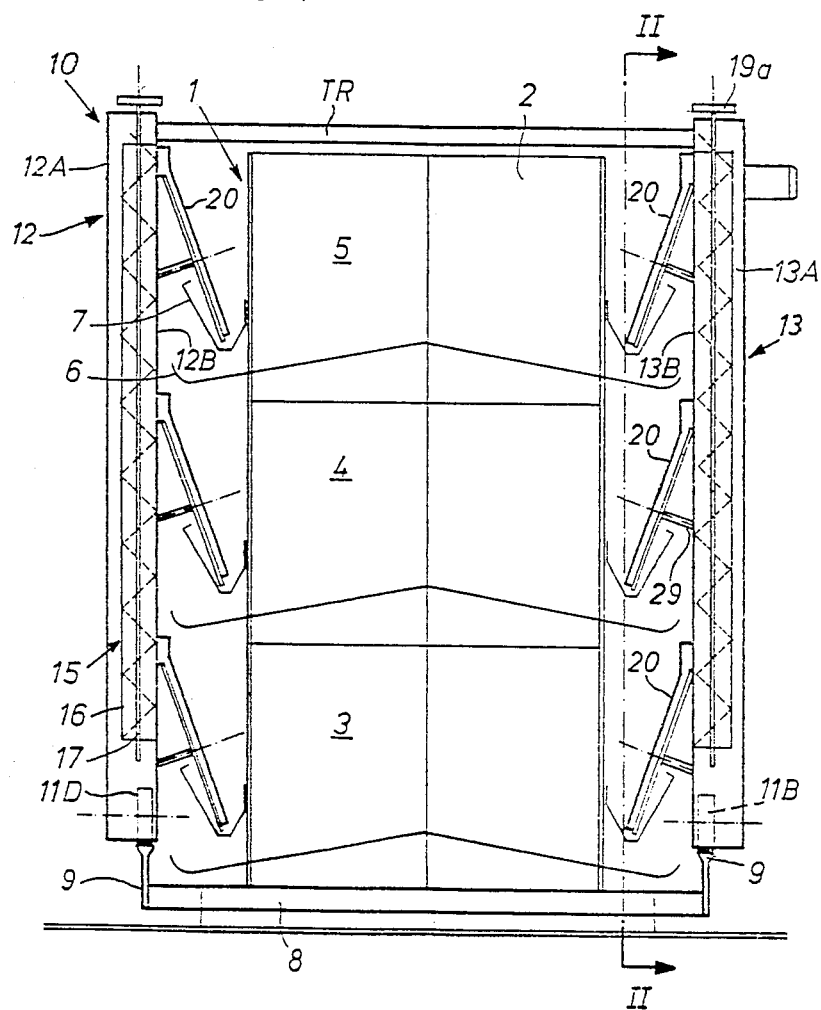
FIG. 1 is a vertical section through a multi-tier arrangement of rows of cage-pairs, such rows extending normal to the picture plane, the two cages of each cage-pair adjoining each other back-to-back in the same tier, and of a travelling feed dispenser apparatus whose travel direction, likewise, extends normal to the picture plane.

As shown in FIG. 1, the arrangement of cages here involved, here used by way of example to house poultry, includes cages arranged in three tiers; a bottom tier 3, a middle tier 4 and a top tier 5. Occupying each of tiers 3, 4, 5 are two long rows of cages, a left row and a right row, the rows of cages extending normal to the picture plane. In any one of the three tiers, the cages of the left row and the cages of the right row adjoin each other back-to-back, i.e., the backs of the cages of the left row directly adjoining the backs of the cages of the right row, thereby forming, in each tier, a row of cage-pairs. The front sides of the cages of each cage-pair accordingly face away from each other, in order to be externally accessible at either the left long side or the right long side of the entire multi-tier arrangement of cage-pairs.

If constructed from the start to be of doubled or cage-pair-type configuration, then the backs of both the left and right cage of a particular cage-pair can be a single or shared cage-back. Each tier 3 or 4 or 5 is provided at its front or accessible long side with a respective egg-collecting grate 6 and a respective feed trough 7, both of which extend horizontally from one to the other end of the long multi-tier arrangement of cage-pairs (and thus normal to the picture plane in FIG. 1).

The entire multi-tier arrangement of cages 1 is, as a whole, supported on transverse supports 8. The leftmost and rightmost ends of the transverse supports 8 (as viewed in FIG. 1) carry a respective one of two rails 9 which together form a travel track for the yet to be described feed dispensing apparatus.

The travelling feed-dispensing apparatus is denoted in toto by numeral 10 and has four wheels 11A, 11B, 11C, 11D which ride on the track-defining rails 9. The travelling feed-dispensing apparatus 10 mainly comprises two side units, each in toto denoted in FIG. 1 by 12 and 13, respectively. As can be seen in FIG. 1, each side unit 12 or 13 has a total height approximately equal to the total height of the entire travelling feed dispenser 10 but a breadth (measured left-to-right in FIG. 1) which is relatively narrow. Side unit 12 has an outward side 12A and an inward side 12B; likewise, side unit 13 has an outward side 13A and an inward side 13B, and the two side units accommodate and mount various components described below. The left and right side units 12, 13 are joined together, above the top end of the multi-tier cage arrangement, by means of various transverse rods TR, of which one is visible in FIG. 1, to thereby form a very rigid overall construction. As a result, the travelling feed-dispensing apparatus 10, when viewed in the travel direction as in FIG. 1, can be seen to embrace the multi-tier cage arrangement both laterally and from above.

Figure 2:
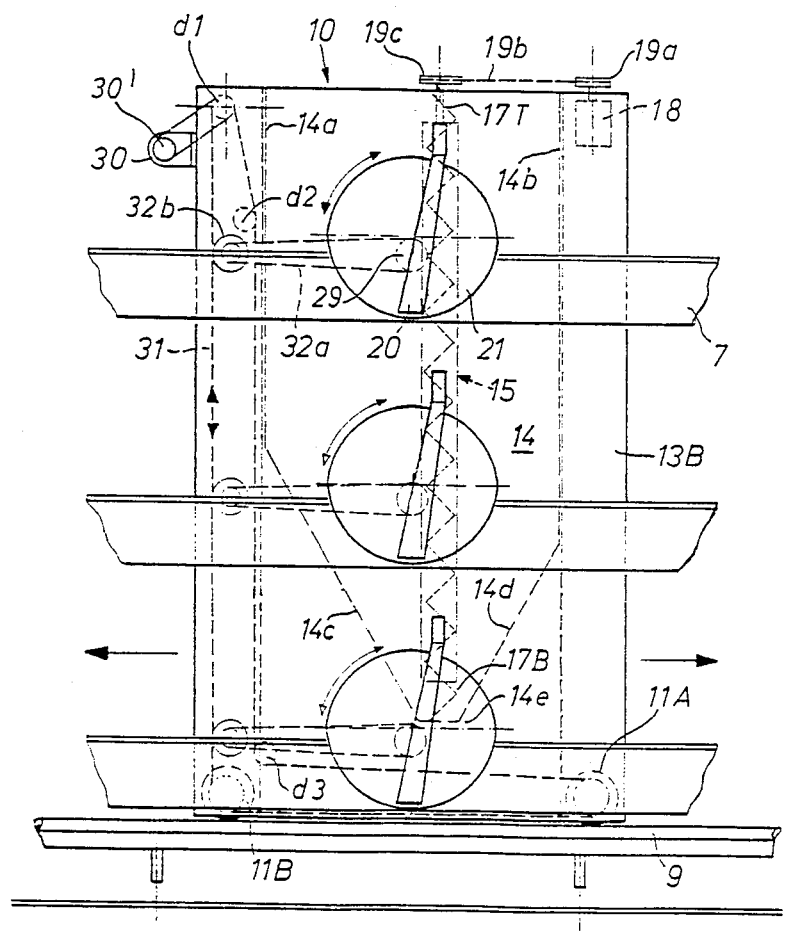
FIG. 2 is a vertical longitudinal section taken along section line II-II of FIG. 1.

Each side unit 12, 13 accommodates a respective feed container 14. As seen best in FIG. 2, which is a longitudinal section along line II—II of FIG. 1, i.e., such that in FIG. 2 the viewer is facing the inward side 13B of side unit 13, side unit 13 accommodates a feed container generally denoted by numeral 14. Container 14 consists of vertical upper wall portions 14a and 14b, downwardly inclined and converging lower wall portions 14c and 14d, as well as (unnumbered) vertical wall portions which are parallel to each other and both parallel to the picture plane. Finally, feed container 14 has a bottom end 14e, which is a closed bottom end. Each feed container 14 interiorly accommodates a lift conveyor generally denoted by 15, which in the illustrated embodiment comprises a vertical conveyor pipe 16 and a conveyor screw 17 which rotates inside the latter. As shown in FIG. 2, the bottom end 17B of conveyor screw 17 extends downwardly past the bottom end of conveyor pipe 16 in order to gather into pipe 16 feed located at the closed bottom end 14e of feed conveyor 14, whereas the top end 17T of conveyor screw 17 extends upwardly past the top end of conveyor pipe 16 in order to return feed to atop the mass of feed in container 14, in so far as feed lifted by conveyor 15 does not in its entirety become discharged into the feed troughs 7 of the various tiers of cages. Conveyor screw 17 is rotated by a drive motor 18, provided at the top of the apparatus, through the intermediary of a transmission formed by a motor pinion 19a, a transmission belt of chain 19b and a driven gear 19c coaxial with the conveyor screw 17.

As shown somewhat schematically in FIG. 1, three outflow chutes 20 are connected-on (e.g. by welding, or other suitable means) to each of the two conveyor pipes 16, each outflow chute 20 extending with a downward incline into a respective one of the three feed troughs 7 at the left side of the cage arrangement, or into a respective one of the three feed troughs 7 at the right side of the cage arrangement.

Figure 3:
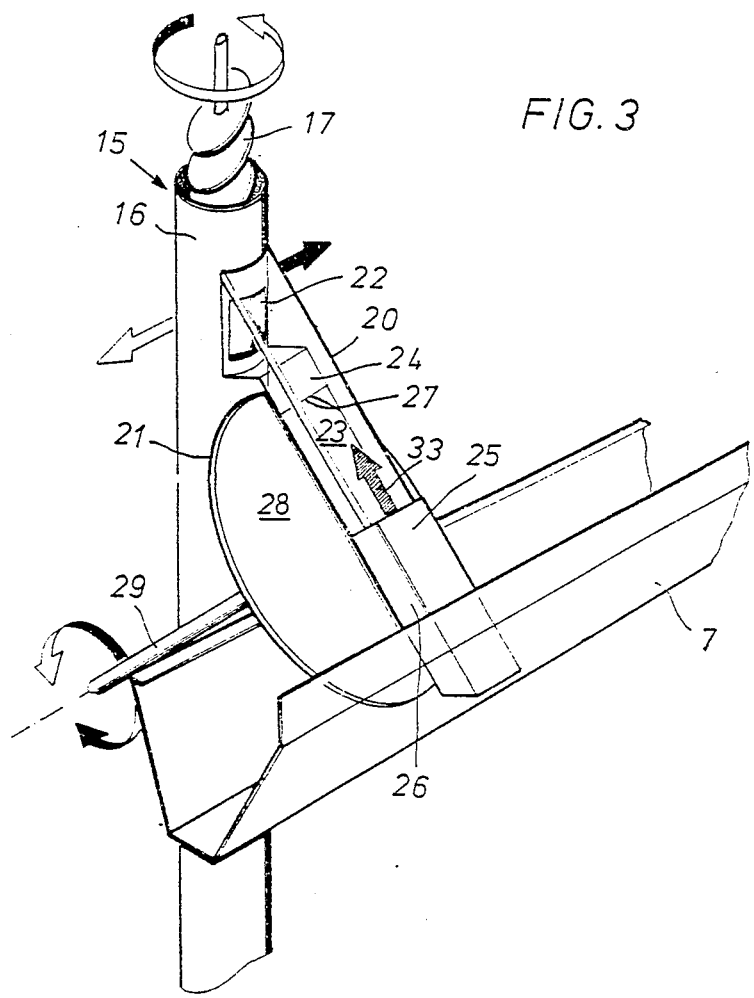
FIG. 3 is an enlarged-scale perspective detail view of certain components of the apparatus of FIGS. 1 and 2.

As shown in greater detail in the perspective view of FIG. 3, the upper end of each outflow chute 20 is, more particularly, connected to a respective conveyor pipe 16 at a respective discharge opening 22 of the latter, pipe 16 having three such discharge openings at three different heights, corresponding to the heights of the three cage tiers 3, 4, 5. Conveyor screw 17 discharges feed at a predetermined or dosed rate, excess feed—as already remarked—being thrown back into the feed container 14 from out the top end of conveyor pipe 16 (cf. FIG. 2). Each downwardly inclined outflow chute 20 forms, in its interior, an inclined outflow passage 23 which is of generally rectangular cross section, being bounded by an inclined, feed-supporting bottom chute wall 24, a likewise inclined top chute wall 25, and two lateral chute walls 26. Bottom chute wall 24 is provided with a wall opening 27 which extends over the entire breadth of the outflow passage 23 (i.e., breadth being here considered in the feed dispenser travel direction) and furthermore extends, in the downwardly inclined direction, along almost the whole length of the elongated outflow passage 23.

Wall opening 27 is closed off by part of the inwards (in FIG. 3, upwardly facing) face of a circular disk 21, the portion of this face of the disk 21 that is exposed to the interior flow passage 23, namely through the wall opening 27, thus constituting a further interior boundary wall portion serving, in part, to delimit or bound the interior flow passage 23 of the chute 20. In the FIG. 3 construction, the disk 21 has a diameter somewhat greater than the length of the wall opening 27 of the chute's bottom wall 24. In the FIG. 3 construction, the circular disk 21 is mounted for rotation about its geometric center, by means of a rotation shaft 29. The disk and shaft are laterally offset (i.e., in the travel direction established by rails 9) to one side of the outflow chute 20 (leftwards of the latter as viewed in FIG. 3), but not so greatly offset that the disk 21 does not still, to at least a small degree, project beyond the opposite side of chute 20 (rightwards of the latter as viewed in FIG. 3). Each of the total of six disks 21 is, by means of its rotation shaft 29, rotatably journalled in a respective one of the two units 12 and 13, for example by a simple sleeve bearing provided at the inwards side 12B or 13B.

As shown in FIG. 2, a drive motor 30 having an output pinion 30' is provided to effect travel of the feed-dispensing apparatus, as a whole, along the track-defining rails 9; in particular an (unnumbered) drive belt or chain travels around output pinion 30', then around deflecting gear d1, rotating the latter. A drive chain 31 travels from gear d1 then past deflecting gear d2, then undergoes a ca. 90° change of direction at deflecting gear d3, then around a reduced-diameter gear portion of rail-engaging wheel 11A, then around a similar such portion of rail-engaging wheel 11B, and finally back up to the first-mentioned gear d1; the two rail-engaging wheels 11C, 11D beneath the other side unit 12 are similarly driven off the travel-implementing drive motor 30.

Advantageously in the illustrated preferred embodiment, the six disks 21 are also driven off the main drive motor 30. Namely, as shown in FIG. 2 for the top one of the three shown disks 21, the disk's rotation shaft 29 is provided with gearing around which is trained an endless drive chain 32a, the latter at its left end (as viewed in FIG. 2) being also trained about the smaller-diameter gearing on a gear 32b. Drive force is transmitted to the latter via the main or travel-effecting drive chain 31, the stretch of drive chain 31 extending between the gearing on wheel 11B and gear d1 engaging a larger-diameter set of gear teeth on the just-mentioned gear 32b.

As indicated in FIG. 2 by the upwards-pointing filled-in arrow and by the downwards-pointing not-filled-in arrow, the drive motor 30 can drive the main drive chain 31 in one or the opposite direction (whether as a result of motor reversal or by means of a change-over of gearing internal to the motor and such as to cause motor pinion 30' to reverse direction). As a result the feed-dispensing apparatus 10 can travel on the track-defining rails 9 in either the direction indicated by the rightwards-pointing filled-in arrow or in the direction indicated by the leftwards-pointing not-filled-in arrow. Because the six disks 21 are, in the way just set forth, driven off the main drive chain 31, these can rotate either in the direction indicated by the clockwise-pointing filled-in arrows or in the counterclockwise-pointing not-filled-in arrows of FIG. 2. The direction in which the disks rotate, as a function of the direction in which the feed-dispensing apparatus travels, is likewise indicated in FIG. 3 by means of the filled-in and not-filled-in arrows, respectively pointing right and left, and by means of the circumferential double arrow about shaft 29, the one rotation direction indicated by the filled-in and the other by the not-filled-in arrowhead. In contrast, the conveyor screws 17 are driven independently of the travel-implementing motor 30, namely in the case of the conveyor 15 of the right side unit 13 by means of the motor 18 as already described, and analogously for the lift conveyor 15 associated with the left side unit 12, and the directions in which the two lift conveyors 15, i.e., the conveyor screws 17 therein, rotate remain always the same independently of the travel direction of the feed-dispensing apparatus 10. As indicated by the large arrow 13 in FIG. 3, the effective portion of the face of disk 21 moves upwards, in effect, for one travel direction of apparatus 10 and accordingly downwards for the opposite travel direction of apparatus 10. As a result, as feed flows down from the lift conveyor's discharge opening 22, down through the inclined outflow chute 20, the movement of the face 28 of disk 21, acting at the wall opening 27, prevents the descending feed from cohering and becoming clogged or non-uniformly discharged from the bottom end of outflow chute 20, a very uniform and continuous release of feed from the bottom end of chute 20 being instead assured. Consequently, all six feed troughs 7 receive equal amounts of feed at all longitudinally successive locations thereof, and the composition of the feed is uniform at all longitudinally successive locations of each trough 7, as well.

I claim:

1. A feed-dispensing apparatus of the type designed to travel along the length of a multi-tier arrangement of cages, especially for poultry, each tier of the multi-tier arrangement comprising a row of cages, the row extending in a predetermined direction which is the direction along which the feed-dispensing apparatus is to travel, the feed-dispensing apparatus comprising feed-container means serving to accommodate feed to be dispensed, lift-conveyor means operative for raising feed accommodated in the feed-container means to a plurality of predetermined elevated levels, each elevated level corresponding to a respective tier of a multi-tier arrangement of cages, and plural chute means, each associated with one of said predetermined elevated levels, operative for receiving feed from said lift-conveyor means at a respective one of said predetermined elevated levels and, at least in part by means of gravity, conveying the thusly received feed from the lift-conveyor means to a predetermined discharge level associated with feed-receiving locations of the cages of a respective tier of such multi-tier arrangement of cages, each chute means comprising a first and a second internal boundary wall surface portion which together define and bound a feed-flow passage internal to the respective chute means, the first internal boundary wall surface portions of the plural chute means being stationary with respect to one another during travel of the feed-dispensing apparatus, the second internal boundary wall surface portion of each chute means being a relatively movable internal boundary wall surface portion mounted for movement relative to the first internal boundary wall surface portion of the respective one of said plural chute means in a direction serving to facilitate free flow of feed through the respective feed-flow passage and prevent clogging of feed in the respective feed-flow passage, the first and second internal boundary wall surface portions of each chute means including a bottom wall portion, the relatively movable internal boundary wall surface portion being at least a part of the bottom wall portion, the relatively movable internal boundary wall surface portion being a downwardly inclined boundary wall surface portion, the apparatus furthermore including a plurality of rotatably mounted disks each having two main faces of which one face, at least in part, constitutes the relatively movable, downwardly inclined boundary wall surface portion of a respective one of the plural chute means.

2. An apparatus as defined in claim 1, the apparatus furthermore including means for causing the rotatably mounted disks to rotate.

3. An apparatus as defined in claim 1, wherein each chute means has a length measured in the direction from the location at which the chute means receives feed to the location at which the chute means discharges feed, each disk being of such dimensions and location that said one face thereof extends over substantially the entire length of the respective chute means.

4. An apparatus as defined in claim 3, each disk being of such dimensions and location that the disk projects, in the travel direction of the apparatus, past one side of the respective chute means and also past the opposite side of the respective chute means.

5. An apparatus as defined in claim 4, each disk having a rotation axis which is offset relative to the respective chute means, as considered in the travel direction of the apparatus, a distance such that the rotation axis is located past the respective chute means, as considered in such direction.

6. An apparatus as defined in claim 1, the apparatus furthermore including shared drive means serving both to effect travel of the feed-dispensing apparatus and to effect rotation of the disks.

7. A feed-dispensing apparatus of the type designed to travel along the length of a multi-tier arrangement of cages, especially for poultry, each tier of the multi-tier arrangement comprising a row of cages, the row extending in a predetermined direction which is the direction along which the feed-dispensing apparatus is to travel, the feed-dispensing apparatus comprising feed-container means serving to accommodate feed to be dispensed, lift-conveyor means operative for raising feed accommodated in the feed-container means to a plurality of predetermined elevated levels, each elevated level corresponding to a respective tier of a multi-tier arrangement of cages, and plural chute means, each associated with one of said predetermined elevated levels, operative for receiving feed from said lift-conveyor means at a respective one of said predetermined elevated levels and, at least in part by means of gravity, conveying the thusly received feed from the lift-conveyor means to a predetermined discharge level associated with feed-receiving locations of the cages of a respective tier of such multi-tier arrangement of cages, each chute means comprising a first and a second internal boundary wall surface portion which together define and bound a feed-flow passage internal to the respective chute means, the first internal boundary wall surface portions of the plural chute means being stationary with respect to one another during travel of the feed-dispensing apparatus, the second internal boundary wall surface portion of each chute means being a relatively movable internal boundary wall surface portion mounted to be capable of endless unidirectional movement relative to the first internal boundary wall surface portion of the respective one of said plural chute means in a direction serving to facilitate free flow of feed through the respective feed-flow passage and prevent clogging of feed in the respective feed-flow passage.

8. An apparatus as defined in claim 7,
the first and second internal boundary wall surface portions of each chute means including a bottom wall portion, the relatively movable internal boundary wall surface portion being at least a part of the bottom wall portion.

9. An apparatus as defined in claim 8,
the relatively movable internal boundary wall surface portion being a downwardly inclined boundary wall surface portion.

10. An apparatus as defined in claim 9,
the apparatus furthermore including means for causing the relatively movable second internal boundary wall surface portions of said plural chute means to continuously move unidirectionally in said direction relative to the respective first internal boundary wall surface portions of said plural chute means.

11. An apparatus as defined in claim 7,
the apparatus furthermore including means for causing the relatively movable second internal boundary wall surface portions of said plural chute means to continuously move unidirectionally in said direction relative to the respective first internal boundary wall surface portions of said plural chute means.

12. An apparatus as defined in claim 7,
wherein each chute means has a length measured in the direction from the location at which the chute means receives feed to the location at which the chute means discharges feed,
each relatively movable second internal boundary wall surface portion being of such dimensions and location as to extend over substantially the entire length of the respective chute means.

13. An apparatus as defined in claim 7,
the apparatus furthermore including shared drive means serving both to effect travel of the feed-dispensing apparatus and to cause the relatively movable second internal boundary wall surface portions of said plural chute means to continuously move unidirectionally in said direction relative to the respective first internal boundary wall surface portions of said plural chute means.

14. A feed-dispensing apparatus of the type designed to travel along the length of a multi-tier arrangement of cages, especially for poultry, each tier of the multi-tier arrangement comprising a row of cages, the row extending in a predetermined direction which is the direction along which the feed-dispensing apparatus is to travel,
the feed-dispensing apparatus comprising
feed-container means serving to accommodate feed to be dispensed,
lift-conveyor means operative for raising feed accommodated in the feed-container means to a plurality of predetermined elevated levels, each elevated level corresponding to a respective tier of a multi-tier arrangement of cages, and
plural chute means, each associated with one of said predetermined elevated levels, operative for receiving feed from said lift-conveyor means at a respective one of said predetermined elevated levels and, at least in part by means of gravity, conveying the thusly received feed from the lift-conveyor means to a predetermined discharge level associated with feed-receiving locations of the cages of a respective tier of such multi-tier arrangement of cages,
each chute means comprising a first and a second internal boundary wall surface portion which together define and bound a feed-flow passage internal to the respective chute means, the first internal boundary wall surface portions of the plural chute means being stationary with respect to one another during travel of the feed-dispensing apparatus, the second internal boundary wall surface portion of each chute means being a relatively movable internal boundary wall surface portion mounted for movement relative to the first internal boundary wall surface portion of the respective one of said plural chute means in a direction serving to facilitate free flow of feed through the respective feed-flow passage and prevent clogging of feed in the respective feed-flow passage,
wherein each chute means has a length measured in the direction from the location at which the chute means receives feed to the location at which the chute means discharges feed,
each relatively movable second internal boundary wall surface portion being of such dimensions and location as to extend over substantially the entire length of the respective chute means.

15. An apparatus as defined in claim 14,
the apparatus furthermore including shared drive means serving both to effect travel of the feed-dispensing apparatus and to cause the relatively movable second internal boundary wall surface portions of said plural chute means to move in said direction relative to the respective first internal boundary wall surface portions of said plural chute means.

16. An apparatus as defined in claim 14,
the first and second internal boundary wall surface portions of each chute means including a bottom wall portion, the relatively movable internal boundary wall surface portion being at least a part of the bottom wall portion.

17. An apparatus as defined in claim 16,
the relatively movable internal boundary wall surface portion being a downwardly inclined boundary wall surface portion.

18. An apparatus as defined in claim 14,
the relatively movable internal boundary wall surface portion being a downwardly inclined boundary wall surface portion.

* * * * *